United States Patent [19]

Kaewell, Jr. et al.

[11] Patent Number: 5,436,955
[45] Date of Patent: Jul. 25, 1995

[54] COMPATIBLE ANALOG CHANNEL UNIT FOR A DIGITAL CELLULAR TELEPHONE SYSTEM

[75] Inventors: John D. Kaewell, Jr., Bensalem; David M. Cooley, Upper Darby, both of Pa.

[73] Assignee: Hughes Aircraft Company, Los Angeles, Calif.

[21] Appl. No.: 99,502

[22] Filed: Jul. 30, 1993

[51] Int. Cl.6 .................... H04M 11/00; H04Q 7/22
[52] U.S. Cl. .......................... 379/59; 379/58; 455/33.1; 455/53.1; 375/216
[58] Field of Search ............ 379/58, 59; 455/84, 455/33.1, 53.1; 375/5

[56] References Cited

U.S. PATENT DOCUMENTS 5,119,397  6/1992  Dahlin et al. ............... 455/33.1
5,228,074  7/1993  Mizikovsky ................ 455/33.1

*Primary Examiner*—Scott A. Rogers
*Assistant Examiner*—Thomas L. Stoll
*Attorney, Agent, or Firm*—Gordon R. Lindeen, III; Wanda K. Denson-Low

[57] ABSTRACT

A compatible analog channel unit for a digital cellular telephone system services both analog and digital mode subscribers on the same system hardware. The analog channel unit which may be configured by the service provider to permit easy upgrading of service during the life of the equipment without additional capital expense to the service provider. All analog system functions required of an analog cellular base station are provided in firmware and executed on commercial digital signal processors (DSPs). The same DSPs, when down-loaded with different firmware, perform TDM/TDMA related functions as required of a digital cellular base station. A system operator can configure channel units from a remote location by simply downloading the appropriate firmware. The channel unit firmware, whether analog or digital, is downloaded into the system hardware according to the assigned mode. This permits dynamic channel allocation according to system requirements. Since this is a digital system, special features may be added by simply revising the system firmware. This means future product enhancements may be provided without affecting the system hardware.

9 Claims, 4 Drawing Sheets

COMPATIBLE ANALOG CHANNEL UNIT FOR A DIGITAL CELLULAR TELEPHONE SYSTEM

BACKGROUND OF THE INVENTION

1. Field of the Invention

The present invention generally relates to digital communication systems and, more particularly, to an implementation of an advanced mobile phone service (AMPS) compatible analog channel unit on a digital cellular, time division multiplex/time division multiple access (TDM/TDMA) hardware platform conforming Electronic Industries Association (EIA) standard EIA-/IS-54B hardware platform.

2. Description of the Prior Art

Advanced mobile phone service (AMPS) is term coined by what was then the Bell System for a cellular mobile-radio system. The basic idea was to divide transmission areas into "cells" to handle radio traffic. The January 1979 issue of *The Bell System Technical Journal*, vol. 58, no. 1, was devoted entirely to AMPS. Cellular mobile telephone systems are now widely installed in many metropolitan areas throughout the United States. As described in *The Bell System Technical Journal*, the service area covered by a cellular system is divided into a number of cells, each having a base station which can effect a telephone connection to any mobile unit located in the cell. The base stations are all connected to and controlled by a central mobile telephone switching office (MTSO) that connects to the telephone network. For additional background on cellular mobile telephone systems, the reader is referred to the textbook by William C. Y. Lee entitled *Mobile Cellular Telecommunications Systems*, McGraw-Hill (1989).

Current cellular systems are analog systems using conventional hardware and analog modulation techniques. There is now an effort to convert many cellular systems to digital systems using digital hardware and digital modulation techniques. There are many advantages to such a conversion, not the least of which is a substantial increase in the number of channels which can be handled within a given frequency allocation. There is, however, a substantial installed base of analog subscribers requiring a transition from analog service to digital service, during which time both analog and digital service must be provided.

Most base station manufacturers provide analog service through analog channel units. In these channel units, functions are implemented using a hardware intensive but now well established approach. This allows the analog channel unit to be manufactured at a lower cost; however, conversion to digital service requires a change in the system hardware accompanied by additional capital expense to the service provider.

SUMMARY OF THE INVENTION

It is therefore an object of the present invention to provide a compatible analog channel unit for a digital cellular telephone system.

It is another object of the invention to provide an analog channel unit which services both analog and digital mode subscribers on the same system hardware.

It is yet another object of the invention to provide an analog channel unit which may be configured by the service provider to permit easy upgrading of service during the life of the equipment.

According to the invention, there is provided a software reconfigurable system that will provide a seamless transition from analog to digital service without additional capital expense to the service provider. All analog system functions required of an analog cellular base station are provided in firmware and executed on commercial digital signal processors (DSPs). The same DSPs, when down-loaded with different firmware, perform TDM/TDMA related functions as required of a digital cellular base station. Thus, the invention allows the base station to provide service to both analog and digital mode subscribers on the same system hardware.

A system operator can configure channel units from a remote location by simply downloading the appropriate firmware. The channel unit firmware, whether analog or digital, is downloaded into the system hardware according to the assigned mode. This permits dynamic channel allocation according to system requirements. Since this is a digital system, special features may be added by simply revising the system firmware. This means future product enhancements may be provided without affecting the system hardware.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
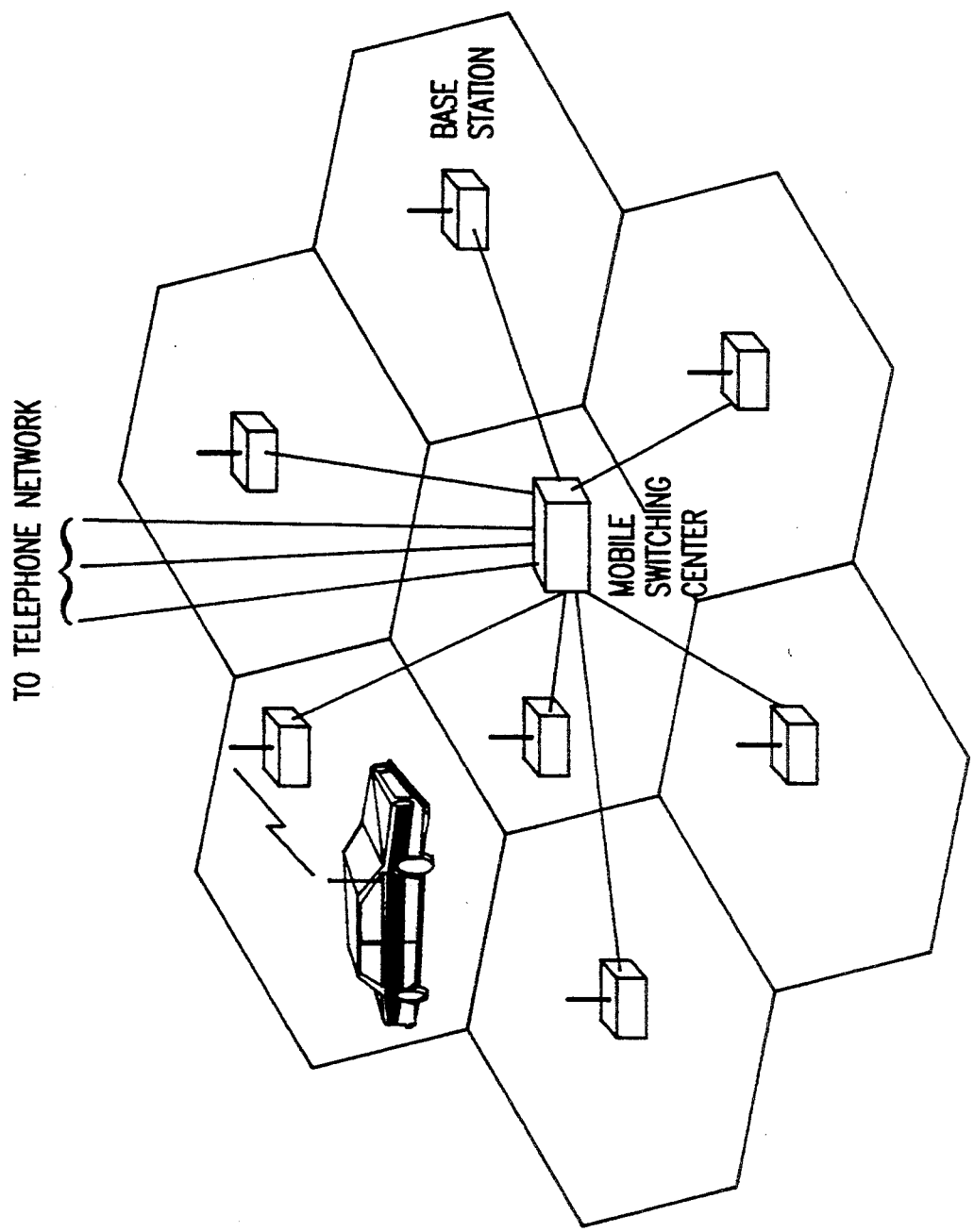
FIG. 1 is a pictorial diagram showing a typical mobile cellular communication system.

Referring now to the drawings, and more particularly to FIG. 1, there is shown a typical mobile cellular communication system which is the environment in which the subject invention is practiced. Each cell is represented as a hexagon and has within its boundaries a base station. The several base stations are connected to a Mobile Telephone Switching Office (MTSO) which provides the interface to the local telephone company central office. A subscriber unit, here represented as being installed in an automobile, communicates with the base station within the cell where that unit is currently located. As the subscriber unit moves from one cell to another, it is handed-off to the base stations of each successive cell that the subscriber unit traverses. This arrangement and the general operation is well known in the art, and for further background on the subject, the reader is referred to the text book by William C. Y. Lee, supra.

At the MTSO, an interface is made to T1 lines connecting to the local telephone company central office on the one hand and to the analog traffic channel unit of the digital cellular system on the other hand. The effective sampling rate of the digital cellular system equipment is 48.6 k-samples/sec. and, therefore, the 8 k-sample/sec processed speech signal has to be interpolated up to the 48.6 k-sample/sec. rate. Likewise, it is necessary to perform a sampling rate conversion of the 48.6 ksample/sec. rate to 40.0 k-samples/sec. to give an integer number of samples (four) per FSK (frequency shift keying) symbol and to allow the eventual integer decimation of the speech signals down to the 8 k-sample/sec. PCM (pulse code modulation) rate for interfacing to the T1 transmission system.

Figure 2:
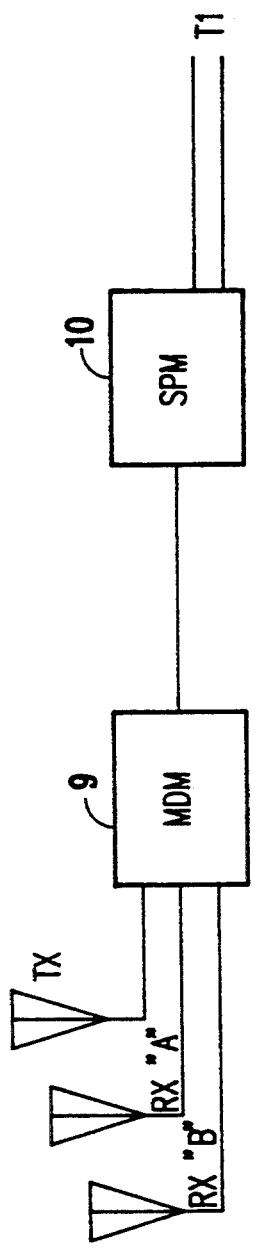
FIG. 2 is a block diagram showing the hardware for a single analog channel unit at a base station.

FIG. 2 shows the basic components of a single analog channel unit at a cell site base station. The hardware comprises a Modulator/Downconverter Module (MDM) 9 and a Slot Processing Module (SPM) 10. The MDM 9 is connected to receiving and transmitting antennas and performs all the RF and IF processing, while the SPM 10 performs all the baseband processing for the channel unit. Two receiving antennas A and B are shown providing input signals to the MDM 9, these being for a space diversity reception system, and the MDM 9 provides an output signal to a single transmitting antenna. Although not shown in FIG. 2, the SPM 10 can accommodate two MDMs 9, supporting up to two transmitting channels and four receiving channels.

Figure 3:
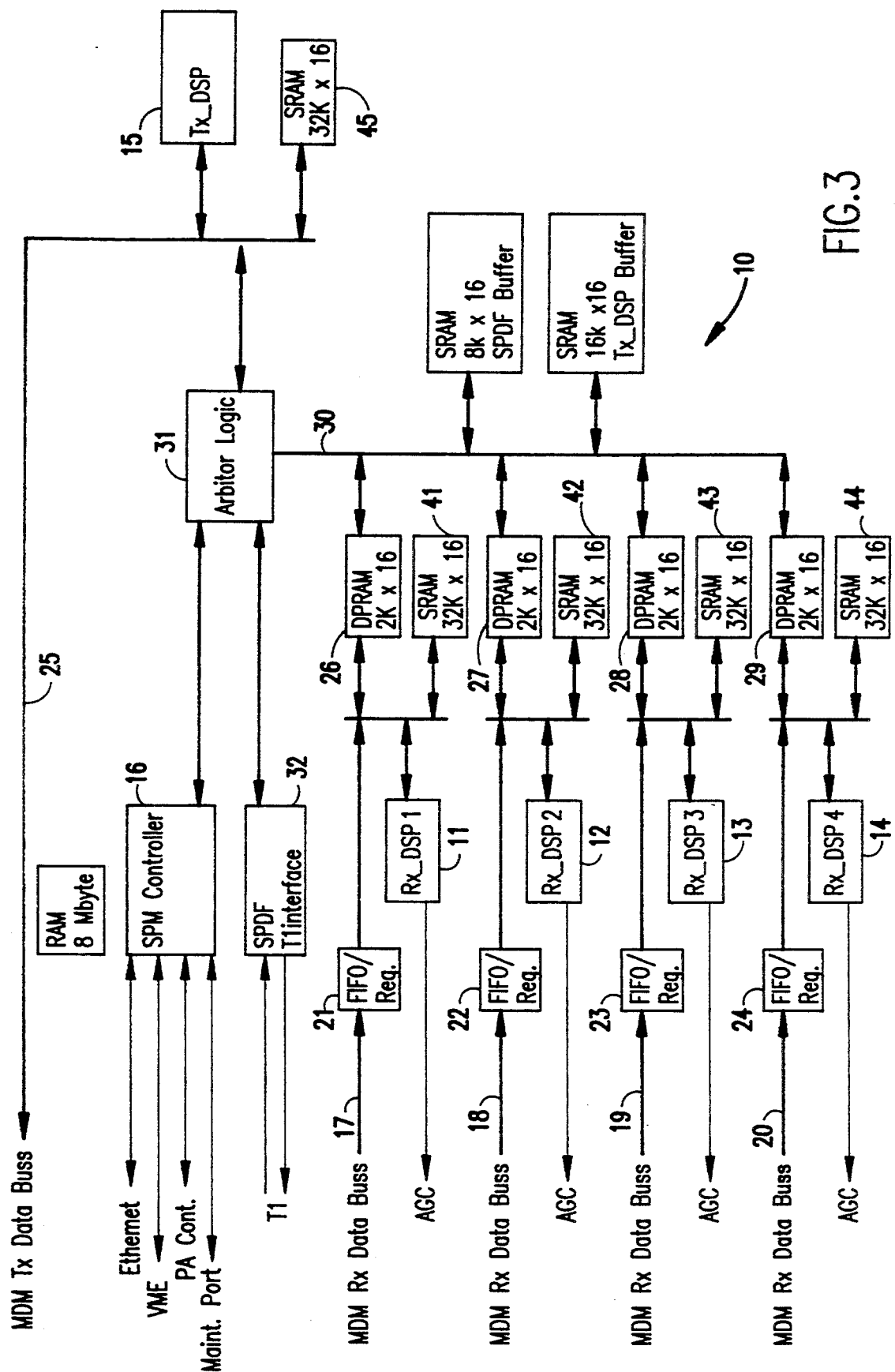
FIG. 3 is a block diagram of the slot processing module (SPM) hardware on which the preferred embodiment of invention is implemented.

FIG. 3 shows the overall block diagram of the SPM 10 in which the invention is implemented. This is a multiprocessor architecture including five, 16-bit fixed point digital signal processors (DSPs), four receiver DSPs, denoted Rx-DSPs, 11, 12, 13, and 14 for the four receiver channels and one transmitter DSP, denoted Tx-DSP, 15 for the transmitter. Each of these DSPs may be, for example, Texas Instruments' TMS320c51s. A reduced instruction set computer (RISC) microprocessor 16 functions as the slot processing module (SPM) controller. The RISC controller 16 may be, for example, an Intel 960 processor. The Rx_DSPs 11, 12, 13, and 14 communicate with modulator/demodulator module (MDM) receive data buses 17, 18, 19, and 20, respectively, via respective first-in/first-out (FIFO) registers 21, 22, 23, and 24, while the Tx_DSP 16 communicates directly with the MDM transmit data bus 25.

Discriminator samples from each of the receive data buses 17, 18, 19, and 20 are written into a corresponding FIFO 21, 22, 23, and 24. The Rx_DSPs 11, 12, 13, and 14 perform the FSK demodulation on the samples, as well as error detection/correction, and then reports the 36-bit receive message and status to controller 16 via dual port RAMs (DPRAMs) 26, 27, 28, and 29 which, in turn, are connected by a common bus 30 to arbiter logic 31. The Tx_DSP 16 is responsible for the formatting of messages as well as creating quadrature baseband FSK modulation samples which eventually modulate the RF carrier.

The synchronous protocol data formatter (SPDF) 32 is a flexible 32-channel direct memory access (DMA) controller which is controlled by the SPM controller 16. The SPDF 32 may be, for example, AT&T's T7115A. During forward voice channel initialization, the controller 16 instructs the SPDF 32 to go to the appropriate Rx_DSP's dual port RAM, which is mapped into the SPDF's data space. In the dual port RAM, the SPDF looks for the Rx descriptor for that particular T1 voice channel. The Rx descriptor consists of instructions written into the dual port RAM by the corresponding Rx_DSP, and the SPDF 32 follows these instructions for a given T1 voice channel. Also connected to the common bus 30 are two static RAMs (SRAMs) 33 and 34. SRAM 33 serves as a buffer for the SPDF 32, while SRAM 34 serves as a buffer for the Tx_DSP 15.

As will be appreciated from the foregoing description, the SPM 10 comprises digital circuitry and processors and is therefore fully capable of supporting a digital cellular protocol. To operate as an analog channel unit, the controller 16 must load the analog firmware into the five DSPs 11, 12, 13, 14, and 15 and then send configuration commands to each DSP specifying its mode of operation (e.g., traffic channel, control channel, etc.). Once the firmware has been loaded, the DSPs respond to the configuration command by executing the modules needed to operate in the configured mode. This is accomplished according to the invention providing the static RAMs (SRAMs) 41, 42, 43, 44, and 45 for each of the DSPs 11, 12, 13, 14, and 15. More specifically, the firmware is downloaded via the SPDF interface 32, arbiter logic 31, bus 30, and DPRAMs 26, 27, 28, and 29 to the SRAMs 41, 42, 43, and 44 and via the SPDF interface 32 and arbiter logic 31 directly to the SRAM 45. This firmware can later be replaced by firmware that reconfigures the system to operate in a purely digital fashion.

When operating as an analog channel unit, the Rx_DSPs 11, 12, 13, an 14 handle both the forward and reverse direction traffic. Forward PCM data from the T1 interface is written into the DPRAMs 26, 27, 28, and 29 by the SPDF 32. The Rx_DSPs provide compression, pre-emphasis, FM modulation, and supervisory audio tone (SAT) signalling. The resulting output from these processes is stored in the DPRAMs to be fetched by the Tx_DSP 15. In the reverse direction, 48.6 kHz FM/FSK discriminated samples from both antennas A and B are interleaved in the FIFOs 21, 22, 23, and 24, whereas the receive signal strength indicator (RSSI) measurements are available in a discrete register of the Rx_DSPs. Antenna selection is based on RSSI measurement for diversity. The Rx_DSPs provide the de-emphasis, expansion, and signaling tone (ST) and SAT detection. The result of these processes are stored in the DPRAMs to be forwarded by the SPDF 32 to the T1 interface.

Figure 4:
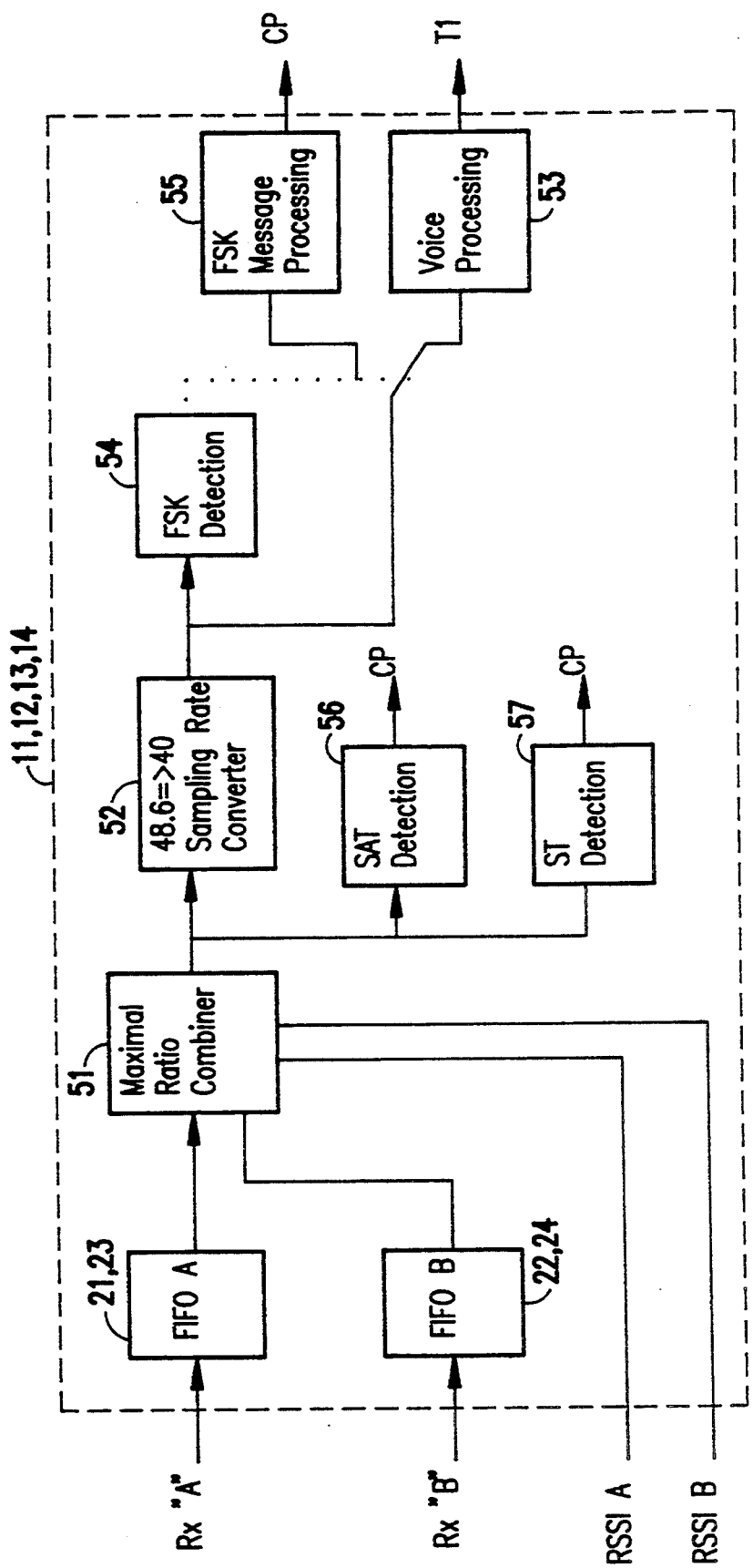
FIG. 4 is a block diagram of the analog receive baseband processing performed by the analog control channel unit hardware shown in FIG. 3.

FIG. 4 shows, in block diagram form, the analog receive baseband processing described above. In FIG. 4, only two of the FIFOs 21 and 22 are shown for the sake of simplicity. These FIFOs temporarily store the receive signals A and B from the MDM 9 (see FIG. 2), and the MDM 9 also supplies two receive signal strength indicator measurements RSSI A and RSSI B. The analog firmware controls the Rx_DSPs 11 and 12, for example, to first perform the function of a maximal ratio combiner 51 by processing the received signal strength indication (RSSI) signals RSSI A and RSSI B to generate a receive signal from the FIFOs 21 and 22 having the best signal-to-noise ratio (S/N). The receive signal is processed by the Rx_DSPs 11 and 12 under the control of the analog firmware to perform the function of sampling gate combiner 52. The sampling gate combiner function 52 performs a sampling rate conversion of the 48.6 k-sample/sec. rate to 40.0 k-samples/sec. to give four samples per FSK symbol and to allow the eventual integer decimation of the speech signals down to the 8 k-sample/sec. PCM (pulse code modulation) rate for interfacing to the T1 transmission system. The speech signals are then further processed, again by the Rx_DSPs 11 and 12 under the control of the analog firmware, in voice processing function 53. Voice processing function 53 performs the decimation of the speech signals, outputting the speech signals to the T1 lines via the SPDF 32.

The Rx_DSP detects the presence of FSK data in place of the FM voice. The Rx_DSPs strip any bit sync and word sync fields from the message, and decode the message, which is reported to the SPM controller 16 via the DPRAMs. These functions are also shown in FIG. 4. In order to detect the control information, the Rx-DSPs 11 and 12, again under the control of the analog firmware, perform an FSK detection function 54 on the output of the sampling gate converter function 52. When FSK control information is detected, the output of the sampling gate converter function 52 is switched by switch function 53 to the FSK message processing function 55. The control information from the FSK message processing function 55 is output to the SPM controller 16 (see FIG. 3). In addition to processing the control information, the Rx-DSPs 11 and 12 also perform supervisory audio tone (SAT) detection function 56 and signaling tone (ST) detection function 57. The outputs of these detection functions 56 and 57 are also output to the SPM controller 16.

In the analog mode of operation, the Tx_DSP 15 provides the interface to the MDM 9, providing limited signal processing with most of the processing being performed by the Rx_DSPs 11, 12, 13, and 14. Forward data is received from the T1 interface by the SPDF 32 and placed in the DPRAM 26, 27, 28, or 29 assigned to that channel. After processing the data, Rx_DSP places the data back in the DPRAM, where it is retrieved by the TX_DSP 15, which completes the processing prior to transmission.

Figure 5:
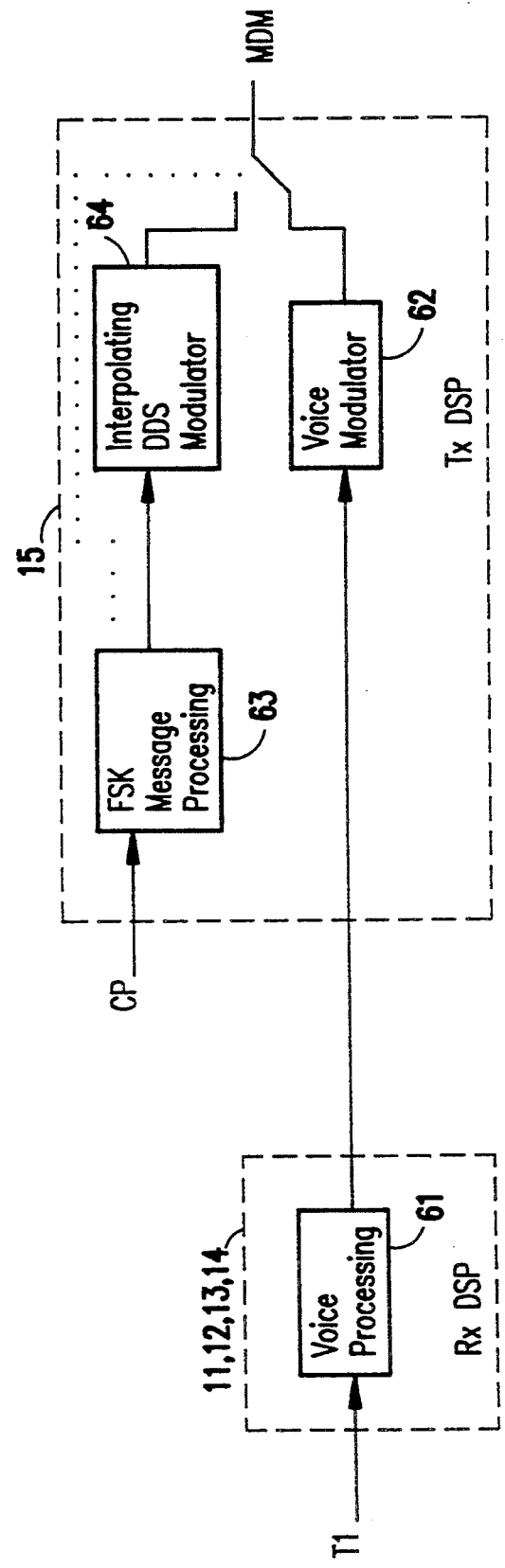
FIG. 5 is a block diagram of the analog transmit baseband processing performed by the analog control channel hardware shown in FIG. 3.

FIG. 5 shows the transmit baseband processing when the analog firmware is downloaded to the SRAMs 41, 42, 43, 44, and 45. The voice signal from the T1 line is processed by one of the Rx_DSPs, say Rx_DSP 21, performing a voice processing function 61 under the control of the analog firmware loaded in SRAM 41. The processed voice signal is output to the Tx_DSP 15 which, under the control of the analog firmware loaded in SRAM 45, performs a voice modulator function 62. The modulated voice signal is then output to the MDM 9 (see FIG. 2).

In addition to voice signals, control information is also transmitted according to the industry standard. Control channel information from the SPM controller 16 is input to the Tx_DSP 15 which, under the control of the analog firmware loaded in SRAM 45, first performs an FSK message processing function 63. This function formats a control frame conforming to the industry specifications and outputs the control frame to the interpolating direct digital synthesizer (DDS) modulator function 64. This DDS modulator function effectively matches the FSK symbol rate to the EIA/IS-54A 24.3 k-symbol/sec. quadrature phase shift keying (QPSK) modulation specification. In the specific embodiment, the FSK symbol rate is 10 kHz, and Manchester encoding doubles the effective symbol rate to 20 kHz. Therefore, the modulator function 64 produces output samples of the 20 k-symbol/sec. Manchester encoded FSK modulation at a sampling rate of 48.6 kHz, which is twice the QPSK symbol rate. The function 64 operates as an over sampled FSK modulator/decimator. When an FSK message is processed by function 63, it is the output of the DDS modulator function 64 which is output to the MDM 9, as generally indicated by the switch function 65.

Multirate signal processing methods are used to allow the processing of the forward and reverse analog signals with sampling rates which are meant for the TDM/TDMA modes of the system but do not necessarily make sense for the analog modes. Special operating modes are available to provide more and better information to the control processor 16. A post detection maximal ratio combiner is used to improve performance in a Rayleigh fading channel. An interpolating direct digital synthesizer (DDS) is used to smoothly transform 10 k-bit/sec Manchester encoded digital data to 48.6 Khz I/Q quadrature samples used to frequency modulate the forward channel carrier.

The invention is readily upgraded to a digital channel unit by simply down loading firmware to the SRAMs 41, 42, 43, 44, and 45. For example, encoding of the forward channel would be performed by the Tx_DSP 15 in digital operation. The SPDF 32 would place received T1 HDLC frames in the SRAM 34. The Tx DSP 15 would build the frame which is transmitted. The demodulated digital data from the MDM 9 would be entered into the FIFOs 21, 22, 23, and 24 of the Rx_DSPs 11, 12, 13, and 14. For example, channel one data would be copied to FIFOs 21 and 22, and channel two data would be copied to FIFOs 23 and 24. After de-interleaving, the data would be separated into Type I and Type II class bits, with one DSP assuming voice traffic and the other DSP assuming a FACCH message. Thus, while the invention initially performs the function of an analog channel unit, using digital processing techniques, it is readily converted to a digital channel unit by simply down loading the appropriate firmware.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A compatible channel unit for a digital cellular telephone system which has the capability of servicing both analog and digital mode subscribers on the same system hardware comprising:

first-in/first-out buffer means connected to a modulator/demodulator unit for temporarily storing digitized received data;

receive digital signal processor means connected to said first-in/first-out buffer means for processing said digitized received data under control of a firmware program;

dual port random access memory means connected to said receive digital signal processor means for storing processing results;

transmit digital signal processor means for formatting data for transmission under control of said firmware program;

static random access memory means connected to each of said receive digital signal processor means and said transmit digital signal processor means for storing said firmware program; and control processor means for downloading said firmware program to said static random access memory means, said firmware program controlling said receive and transmit digital signal processor means to process either analog or digital voice data thereby permitting said channel unit to be configured either as an analog channel unit or a digital channel unit.

2. The compatible channel unit for a digital cellular telephone system recited in claim 1 further comprising synchronous protocol data formatter means for performing a direct memory access function for said dual port random access memory means, said control processor controlling said synchronous protocol data formatter means.

3. The compatible channel unit for a digital cellular telephone system recited in claim 2 wherein said firmware program controls said receive digital signal processor means to perform forward traffic analog processing of voice data to be transmitted and store a resulting output in said dual port random access memory means for fetching by said transmit digital signal processor means using said synchronous protocol data formatter means.

4. The compatible channel unit for a digital cellular telephone system recited in claim 3 wherein said firmware program controls said receive digital signal processor means to perform reverse traffic analog processing of data in said first-in/first-out buffer means to generate an analog voice data output.

5. The compatible channel unit for a digital cellular telephone system recited in claim 4 wherein said first-in/first-out buffer means stores space diversity derived data, said receive digital signal processor means performs a function of a maximal ratio combiner to generate a receive signal from data in said first-in/first-out buffer means.

6. The compatible channel unit for a digital cellular telephone system recited in claim 4 wherein said receive digital signal processor means performs a function of a sampling rate conversion of data in said first-in/first-out buffer means.

7. The compatible channel unit for a digital cellular telephone system recited in claim 6 wherein said receive digital signal processor means performs a function of decimation of signals from the sampling rate conversion function to generate said analog voice data output.

8. The compatible channel unit for a digital cellular telephone system recited in claim 4 wherein said firmware program additionally controls said receive digital signal processor means to perform a control information detection function, outputting detected control information to said control processing means.

9. The compatible channel unit for a digital cellular telephone system recited in claim 4 wherein said firmware program additionally controls said receive digital signal processor means to perform a supervisory audio tone detection function.

* * * * *